H. B. VALADE.
NON-FREEZABLE WINDOW.
APPLICATION FILED APR. 18, 1919.

1,394,237.

Patented Oct. 18, 1921.
2 SHEETS—SHEET 1.

Inventor
H. B. Valade

By D. Swift & Co
Attorneys

UNITED STATES PATENT OFFICE.

HECTOR B. VALADE, OF KANKAKEE, ILLINOIS.

NON-FREEZABLE WINDOW.

1,394,237. Specification of Letters Patent. Patented Oct. 18, 1921.

Application filed April 18, 1919. Serial No. 291,106.

*To all whom it may concern:*

Be it known that I, HECTOR B. VALADE, a citizen of the United States, residing at Kankakee, in the county of Kankakee, State of Illinois, have invented a new and useful Non-Freezable Window; and I do hereby declare the following to be a full, clear, and exact description of the invention, such as will enable others skilled in the art to which it appertains to make and use the same.

The invention relates to windows and has for its object to provide an auxiliary window, which may be easily and quickly attached to the window frame of a street car or of a motor driven vehicle in such a manner as to closely engage the glass in the vehicle window so as to form a compartment between the vehicle window and the glass of the auxiliary frame, by the formation of which compartment the freezing of moisture that may gather on either glass is prevented.

A further object is to provide the auxiliary window with a tapered gasket for engagement with the glass of the car window, said gasket forming means whereby the outside atmosphere is excluded from between the car window and the auxiliary window, the tapering of the gasket assuring the close fitting and conforming of the same to the surface of the glass of the car window.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
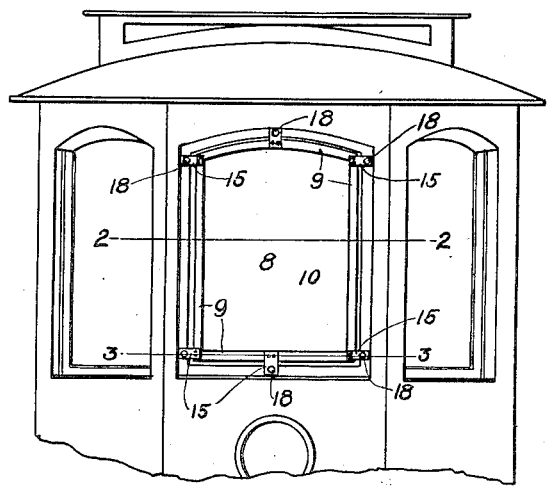
Figure 1 is a front elevation of a street car showing the auxiliary window attached thereto.
Figure 4:
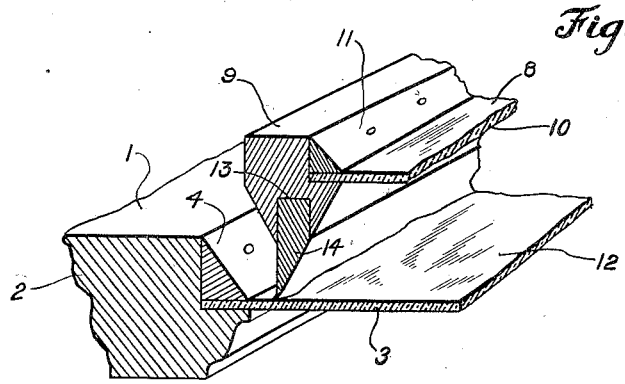
Fig. 4 is a detail perspective view of one side of the car window and the frame.
Figure 2:
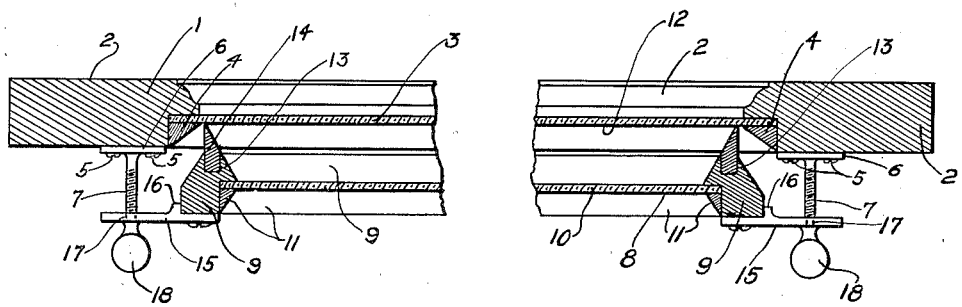
Fig. 2 is a horizontal sectional view taken on line 2—2 of Fig. 1.
Figure 3:
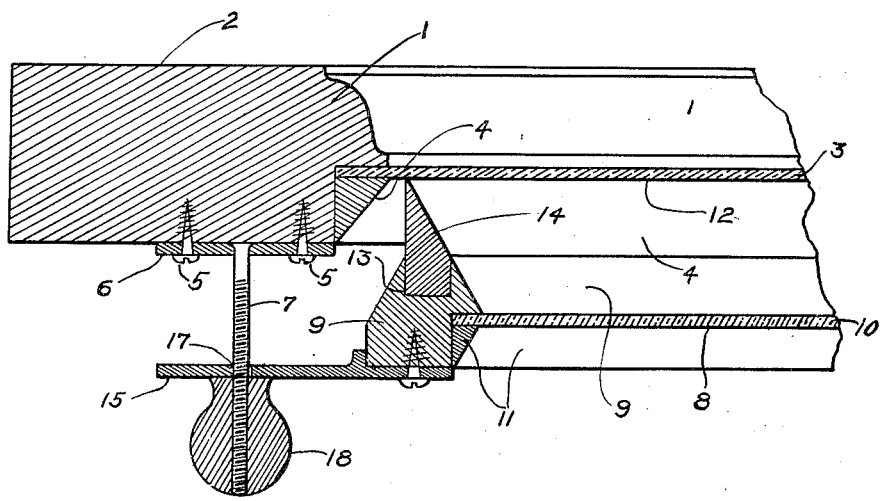
Fig. 3 is an enlarged sectional view through one side of the car window and the auxiliary frame.

Referring to the drawings the numeral 1 designates a car window frame and 2 side and end rails thereof. The window 2 is provided with a glass 3 which is secured and maintained in the frame 1 by means of strips 4, which may be nailed to the rails of the frame or otherwise secured. The outer face of the frame has secured to the rails thereof, by means of screws 5, plates 6, each plate being provided with a threaded screw 7.

The auxiliary frame 8 is rectangular in shape and is formed with side and end rails 9, however the auxiliary frame is smaller than the frame of the car window. A glass is provided in the auxiliary window and this glass 10 is held in position in the frame 8 by means of strips 11, which may be nailed to the side rails 9, or may be otherwise secured; however the securing therein should be as near airtight as possible so as to exclude the passage of air to the chamber 12 formed between the car window and the auxiliary frame. The rails 9 of the frame 8 are provided with channels 13 in which are disposed gaskets 14; these gaskets may be vulcanized together where they meet at the corners of the auxiliary frame. To insure the close fitting of the gaskets to the glass 3 the gaskets have their outer edges tapered or V-shaped in cross section, thereby insuring the close fitting of the gasket to the glass 3 in such a manner as to conform to the surface thereof, also in case there is any foreign matter on the glass, the gasket will easily bridge the same and form a close fit. Extending outwardly from the rails 9 of the frame 8 are plates 15, these plates being provided on their under surfaces with lugs 16, which engage the sides of the rails. The outer ends of the plates 15 are provided with apertures 17, which are adapted to receive the screws 7 when the auxiliary frame is placed in position, there being knobs 18 threaded on the ends of the screws 7, by the turning of which the auxiliary frame may be moved so as to force the tapered edge of the gasket into close engagement with the window glass, thereby forming an airtight bearing on the glass. However when it is desired to remove the auxiliary frame it will only be necessary to unscrew the knobs 18 and remove the frame.

From the above it will be seen that an auxiliary frame for windows has been provided which may be quickly attached and removed from the window, also that the close binding of the same against the car window is assured in such a manner that the entrance of air to the chamber between the windows is prevented.

It will be seen that by adjusting the auxiliary sash inwardly that the gasket 14 carried thereby will be forced outwardly into engagement with the inner edge of the main sash, thereby preventing the glass 12 in the main sash from being chilled by exposure to the outside atmosphere.

The invention having been set forth what is claimed as new and useful is:—

The combination of a window sash having a glass therein, of an auxiliary window sash smaller than the window sash of the main window and having a glass therein, said auxiliary window sash having its sides equally spaced from the inner edges of the sides of the main window sash but adjacent thereto, a gasket carried by the inner face of the auxiliary sash and so disposed that it will engage the glass of the main sash adjacent the edge thereof, said gasket being so constructed that upon adjusting the auxiliary sash inwardly the gasket will spread outwardly into engagement with the inner edge of the main sash thereby protecting the glass of the main sash from the outside atmosphere and means carried by the main sash and auxiliary sash for adjustably securing said sashes together and causing the gasket to be forced outwardly into engagement with the inner edge of the main sash.

In testimony whereof I have signed my name to this specification in the presence of two subscribing witnesses.

HECTOR B. VALADE.

Witnesses:
E. BELAUME,
ROBERT C. LANGLOIS.